United States Patent
Naruse

(10) Patent No.: US 8,385,520 B2
(45) Date of Patent: *Feb. 26, 2013

(54) INFORMATION APPARATUS AND CONTROL METHOD OF THE SAME

(75) Inventor: Taketomo Naruse, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 908 days.

This patent is subject to a terminal disclaimer.

(21) Appl. No.: 12/477,761

(22) Filed: Jun. 3, 2009

(65) Prior Publication Data

US 2009/0238351 A1 Sep. 24, 2009

Related U.S. Application Data

(63) Continuation of application No. 11/235,118, filed on Sep. 27, 2005, now Pat. No. 7,587,035.

(30) Foreign Application Priority Data

Sep. 29, 2004 (JP) ................................. 2004-283285

(51) Int. Cl.
*H04M 11/00* (2006.01)
(52) U.S. Cl. .............................. 379/100.01; 379/100.06
(58) Field of Classification Search ............. 379/100.01, 379/100.06
See application file for complete search history.

(56) References Cited

U.S. PATENT DOCUMENTS

| | | | |
|---|---|---|---|
| 5,739,453 A | 4/1998 | Chihana et al. | |
| 6,058,336 A | 5/2000 | Hayama et al. | |
| 6,647,102 B2 | 11/2003 | Hirai et al. | |
| 7,021,844 B2 | 4/2006 | Tanaka et al. | |
| 7,587,035 B2 * | 9/2009 | Naruse | 379/100.01 |
| 2002/0054269 A1 | 5/2002 | Hirai et al. | |
| 2002/0054369 A1 | 5/2002 | Hirai et al. | |
| 2004/0143746 A1 | 7/2004 | Ligeti et al. | |

FOREIGN PATENT DOCUMENTS

| | | |
|---|---|---|
| JP | 6-233019 | 8/1994 |
| JP | 2000-284770 | 10/2000 |
| JP | 2002-077477 | 3/2002 |
| JP | 2002-232611 | 8/2002 |
| JP | 2004-61148 | 2/2004 |
| KR | 2004-0069953 | 8/2004 |

* cited by examiner

*Primary Examiner* — Stella Woo
(74) *Attorney, Agent, or Firm* — Fitzpatrick, Cella, Harper & Scinto

(57) ABSTRACT

After the user purchased an information apparatus, even when he turns on a power source without setting a line and automatic line identification fails, a demonstration mode is not started, and when the information apparatus exists in a shop, the demonstration mode can be certainly started by the minimum number of steps. The information apparatus has: a communicating situation identifying unit for identifying a communicating situation of the information apparatus; a display unit for displaying the demonstration mode and an electronic key for promoting sales of the information apparatus; an operation unit for selecting the electronic key; and a control unit for identifying the communicating situation when the power source is turned on, starting a regular mode in which the information apparatus is normally used when the identification of the communicating situation succeeds, and displaying a demonstration mode selection display screen to select start-up of the demonstration mode when the identification of the communicating situation fails.

6 Claims, 8 Drawing Sheets

INFORMATION APPARATUS AND CONTROL METHOD OF THE SAME

This application is a continuation of U.S. patent application No. 11/235,118, filed Sep. 27, 2005, the contents of which are incorporated by reference herein.

BACKGROUND OF THE INVENTION

1. Field of the Invention

The invention relates to control means of a demonstration mode in an information apparatus and a control method of the information apparatus.

2. Related Background Art

Among conventional information apparatuses such as a telephone apparatus and the like, there are many apparatuses in which a demonstration mode which appeals a new function, a selling point, or the like, that is, a demonstration mode which visually appeals to the user at a shop has been installed. Further, also in facsimile apparatuses, there is a facsimile apparatus constructed in such a manner that although the copying operation is executed when the user sets an original and depresses a copy key, if he depresses the copy key without setting the original, an image for demonstration is printed (for example, refer to Japanese Patent Application Laid-Open No. 2002-077477).

However, if the user purchases the information apparatus in which the demonstration mode has been installed, the demonstration mode becomes unnecessary after the purchase. Therefore, if the demonstration mode is automatically cancelled after he purchased the information apparatus, it is convenient.

There is a telephone apparatus as an information apparatus in which the demonstration mode has been installed. An automatic line identification function for identifying whether a connected telephone line is a PB (push-button, tone) line or a DP (dial-pulse) line at the time of turn-on of a power source has been installed in the recent telephone apparatus. The invention in which the foregoing automatic line identification function is used as a trigger to cancel the demonstration mode has been proposed (for example, refer to Japanese Patent Application Laid-Open No. 2002-232611, Japanese Patent Application Laid-Open No. H06-233019).

Ordinarily, in a shop, since the power source is turned on without connecting the line, the automatic line identification fails, on the other hand, if the user purchases a telephone apparatus, since the power source is turned on after the line was set, the automatic line identification succeeds. Therefore, by checking whether or not the automatic line identification succeeds after the turn-on of the power source, whether the telephone apparatus exists in the shop or on the user destination side can be discriminated.

In other words, if the automatic line identification succeeds, it is determined that the user purchased the telephone apparatus, and the demonstration mode is cancelled. If the automatic. line identification fails, it is determined that the telephone apparatus exists in the shop, and the demonstration mode is not cancelled.

However, according to the above construction of the conventional example, there is such a problem that if the user turns on the power source without setting the line after the purchase of the telephone apparatus, since the automatic line identification fails, the demonstration mode which is unnecessary for the user is started, and the user has to manually cancel the demonstration mode.

SUMMARY OF THE INVENTION

It is an object of the invention to provide an information apparatus constructed in such a manner that after the user purchased the information apparatus, he turns on a power source without setting a line and even when automatic line identification fails, a demonstration mode is not started, and when the information apparatus exists in a shop, the demonstration mode can be certainly started by the minimum number of processing steps.

According to the invention, there is provided an information apparatus comprising: line connecting situation identifying means for identifying a line connecting situation of the information apparatus; an executing unit for executing a demonstration mode of the information apparatus; a display unit for displaying; an operation unit for executing an operation; and control means for identifying the line connecting situation when a power source is turned on, starting a regular mode in which the information apparatus is normally used when the identification of the line connecting situation succeeds, and displaying a demonstration mode selection display screen to select start-up of the demonstration mode when the identification of the line connecting situation fails.

According to the invention, there is provided a control method of an information apparatus, comprising: a communicating situation identifying step of identifying a communicating situation of the information apparatus; and a control step of controlling in such a manner that when a power source is turned on, the communicating situation is identified, when the identification of the communicating situation succeeds, a regular mode in which the information apparatus is normally used is started, and when the identification of the communicating situation fails, a demonstration mode selection display screen to select start-up of the demonstration mode is displayed.

DETAILED DESCRIPTION OF THE PREFERRED EMBODIMENS

The best modes for embodying the invention are the following embodiments.

(Embodiment 1)

Figure 1:
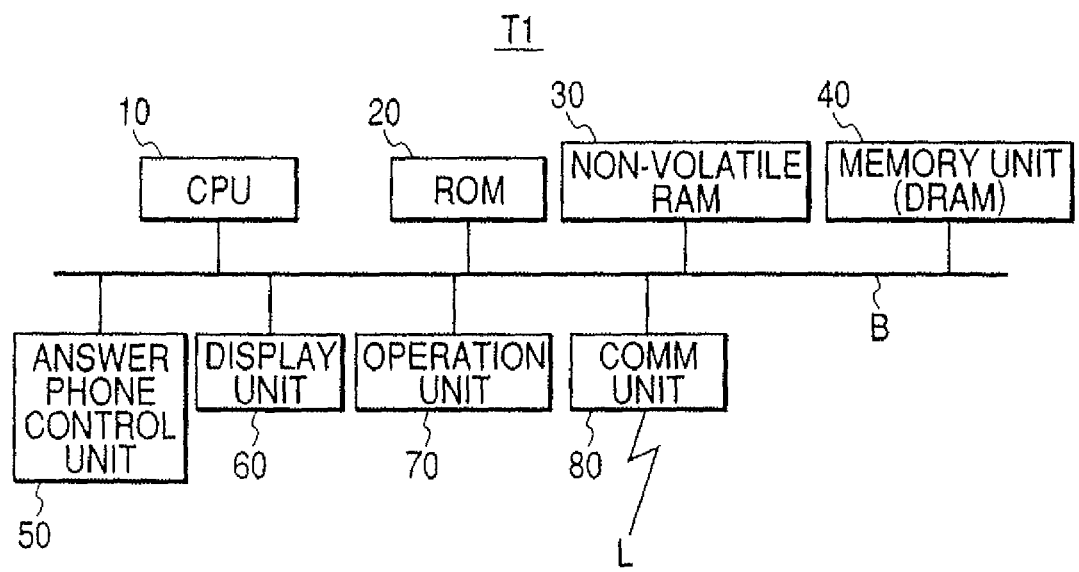
FIG. 1 is a constructional diagram showing a telephone apparatus T1 according to the embodiment 1.

FIG. 1 is a constructional diagram showing a telephone apparatus T1 according to the embodiment 1.

The telephone apparatus T1 has: a central processing unit (CPU) 10; a ROM 20; a non-volatile RAM 30; a memory unit (DRAM) 40; an answer phone control unit 50; a display unit 60; an operation unit 70; a communication unit 80; and a system bus B.

The CPU 10 controls the whole telephone apparatus T1.

The ROM 20 stores programs and data.

The non-volatile RAM 30 is a memory to store backup data such as personal data, telephone directory, and the like.

The memory unit (DRAM) 40 is constructed by a CPU work space, a user specifying information storing area, a response message selection information storing area, and the like.

The answer phone control unit 50 accesses the user specifying information storing area, the response message selection information storing area, or the like and edits setting values and data.

The display unit 60 displays display screen information such as a demonstration mode start-up selection display screen 90 or the like in color.

The operation unit 70 has a ten-key and the like.

The communication unit 80 is connected to a line L and constructed by a modem for communicating with the outside, an NCU (Network Control Unit) for performing call connection, and the like.

That is, the CPU 10 is an example of communicating situation identifying means for identifying a communicating situation of the information apparatus. The display unit 60 is an example of a display unit for displaying the demonstration mode for promoting sales of the information apparatus and electronic keys. The operation unit 70 is an example of an operation unit for selecting the electronic keys. The demonstration mode (also referred to as a sales promoting mode) is a mode for automatically repeating the demonstration in the case where the information apparatus is exhibited in a shop to promote the sales, that is, a mode for automatically repeating the demonstration to display an actual display screen when the apparatus is used or lighting on the ten-key.

The CPU 10 is an example of control means for identifying the communicating situation when a power source is turned on, starting the regular mode in which the information apparatus is normally used when the identification of the communicating situation succeeds, and displaying the demonstration mode selection display screen to select the start-up of the demonstration mode when the identification of the communicating situation fails.

Figure 2:
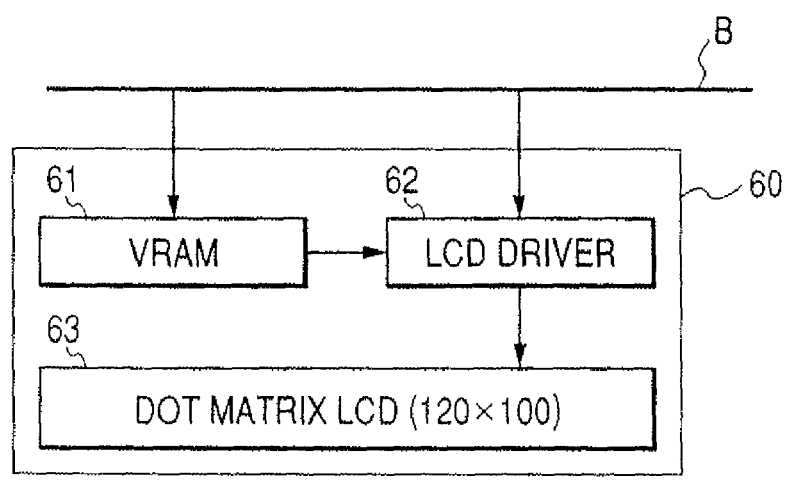
FIG. 2 is a diagram showing a construction of a display unit 60 provided for the telephone apparatus T1.

FIG. 2 is a diagram showing a construction of the display unit 60 provided for the telephone apparatus T1.

The display unit 60 has: a VRAM 61 for storing the display data; an LCD driver 62 for outputting contents in the VRAM 61 to a dot matrix LCD 63; and the dot matrix LCD 63.

Figure 3:
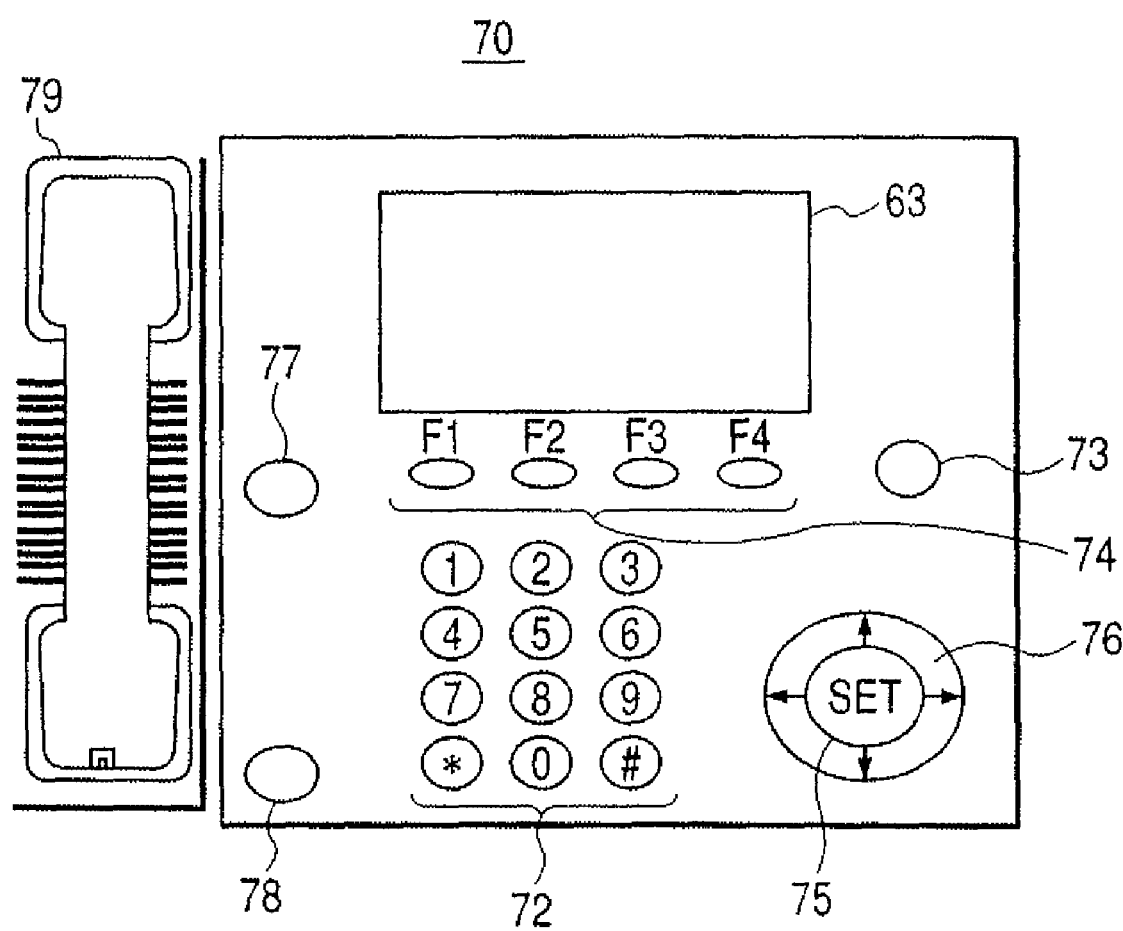
FIG. 3 is a diagram showing an external construction of an operation unit 70 constructing the telephone apparatus T1.

FIG. 3 is a diagram showing an external construction of the operation unit 70 constructing the telephone apparatus T1.

The operation unit 70 has: a ten-key 72 for inputting a telephone number or the like; a function key 73 which is used for function setting or the like; four function keys 74 which are used for multi-function inputting; a set key 75 as a setting input key; a right/left/upper/lower direction key (crossing key) 76 which is used for cursor movement or the like of the display unit 60; an answer phone key 77 which is used to switch an answer phone telephone mode; a stop key 78 which is used to interrupt the operation which is being executed; and a handset 79 which is used to record voice data of a speech or the answer phone.

The operation which is executed until whether or not the demonstration mode is started is selected after turn-on of the power source of the telephone apparatus T1 and the regular start-up or the demonstration mode start-up is executed will now be described.

Figure 4:
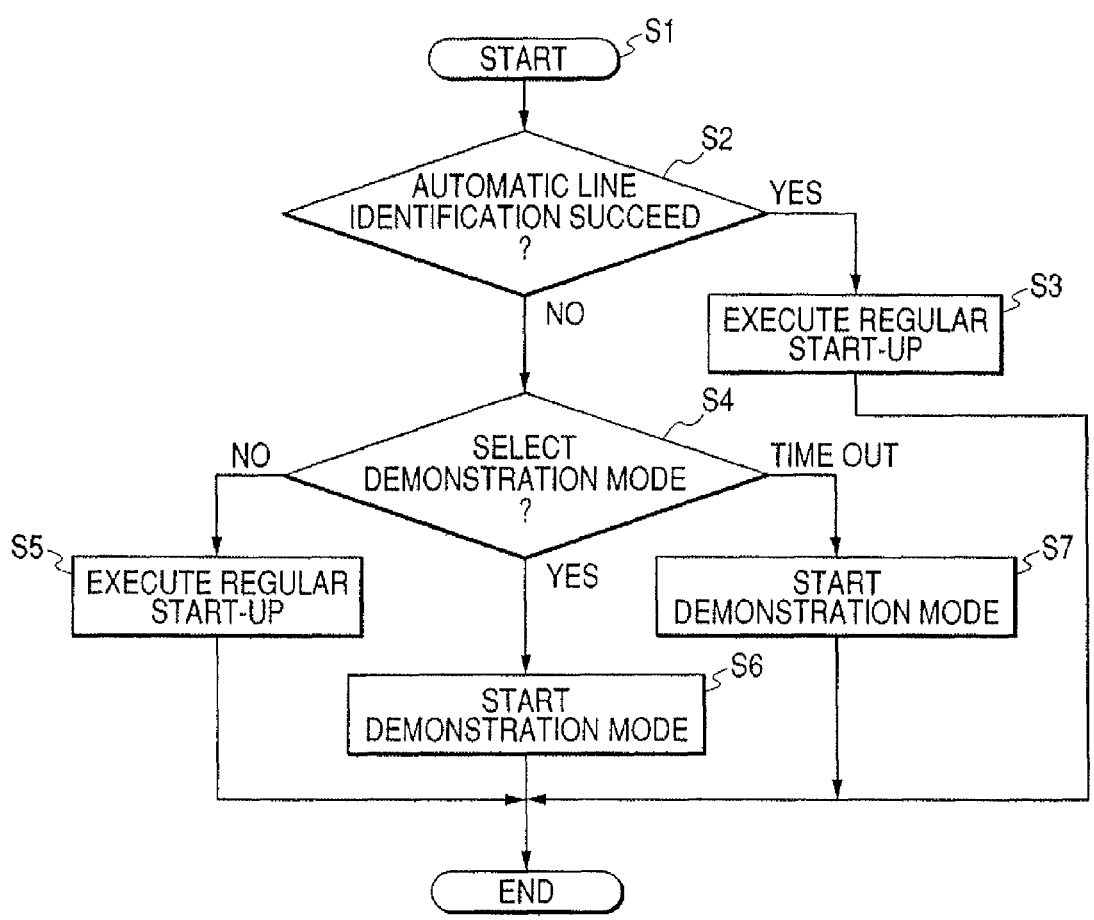
FIG. 4 is a flowchart showing the operation which is executed until whether or not a demonstration mode is started is selected after turn-on of a power source of the telephone apparatus T1. and a regular start-up or a demonstration mode start-up is executed.

FIG. 4 is a flowchart showing the operation which is executed until whether or not the demonstration mode is started is selected after turn-on of the power source of the telephone apparatus T1 and the regular start-up or the demonstration mode start-up is executed.

The processing routine is started in step S1. Whether or not the line used by the user is the PB, (push-button, tone) line or the DP (dial-pulse) line is discriminated by using the automatic line identification function in S2. If this identification succeeds, this means that after the purchasing of the telephone apparatus T1, he connected the telephone line and turned on the power source. Therefore, the regular start-up is executed in S3 and the processing routine is finished. If the identification fails, this means that the user turned on the power source without connecting the telephone line. Therefore, the processing routine advances to S4. That is, in S2, the type of the connected line is identified by using the automatic line identification function for automatically identifying the type of the connected telephone line and whether or not the line has been connected is discriminated.

As a case where the processing routine advances to S4, there is a case where the user turned on the power source without connecting the telephone line after the purchasing of the telephone apparatus T1 or a case where the demonstration is executed in the shop.

A salesperson inquires of the user about whether or not he starts the demonstration mode in S4. If he makes an answer showing that he does not start up the demonstration mode, the regular start-up is executed in S3. If he makes an answer showing that he starts the demonstration mode, the demonstration mode is started up in S6. If time-out of a predetermined time occurs without receiving such an answer, the demonstration mode is started up in S7.

Figure 5:
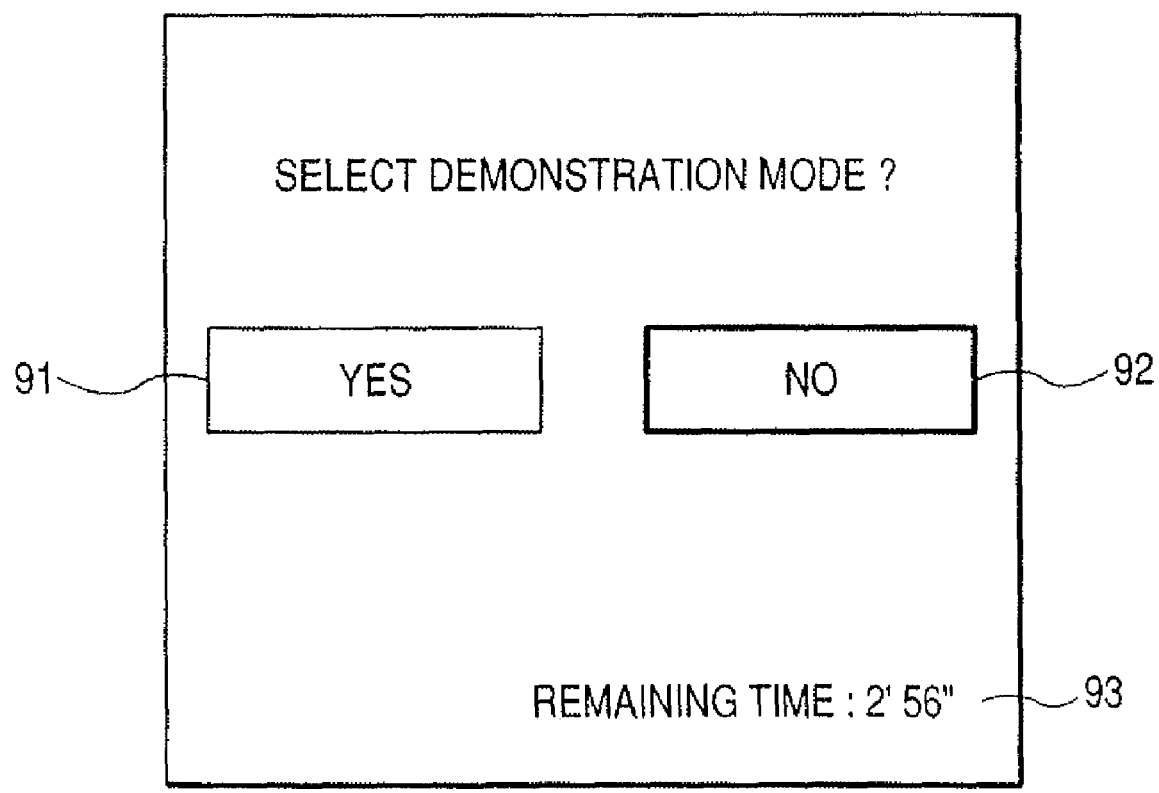
FIG. 5 is a diagram showing a demonstration mode start-up selection display screen 90.

FIG. 5 is a diagram showing the demonstration mode start-up selection display screen 90.

A key 91 to start the demonstration mode, a key 92 which does not start the demonstration mode, and a remaining time 93 are displayed on the demonstration mode start-up selection display screen 90.

The user selects whether or not the demonstration mode is started by using either the demonstration mode start-up key (also simply referred to as a "YES" key) 91 or the demonstration mode not-start-up key (also simply referred to as a "NO" key) 92. The key 91 or 92 is focused and the user selects a desired mode by using the crossing key 76 of the operation unit 70 and depresses the set key 75, so that a result of the selection by the user is determined. The not-start-up key 92 has been focused at the initial stage. A count-down of the predetermined time is displayed in the column of the remaining time 93. When the predetermined time elapses in the non-operating state, the demonstration mode start-up key 91 is automatically selected.

The demonstration mode start-up selection display screen 90 is displayed in S4 shown in FIG. 4. When the not-start-up key 92 is selected, the regular mode is started in S5 and the processing routine is finished. When the start-up key 91 is selected, the demonstration mode is started in S6 and the processing routine is finished. When the predetermined time elapses in the non-operating state, the demonstration mode is started in S7 in a manner similar to the case where the start-up key 91 is depressed and the processing routine is finished.

Therefore, when the general user merely selects the not-start-up key 92, the demonstration mode is finished.

When the salesperson in the shop merely selects the start-up key 91, the demonstration mode can be started. By monitoring the non-operating state, for example, even in the case of a large-scale store or the like where a number of articles are arranged and there is not a time enough to set apparatuses one by one each time the power source is turned on, the demonstration mode can be started without executing any operation and he can properly cope with such a situation.

Since the not-start-up key 92 has initially been focused, even for the user who does not understand the demonstration mode, merely by depressing the set key 75, the demonstration mode can be finished, he can properly cope with the operation, and the number of erroneous operations is reduced.

(Embodiment 2)

Figure 6:
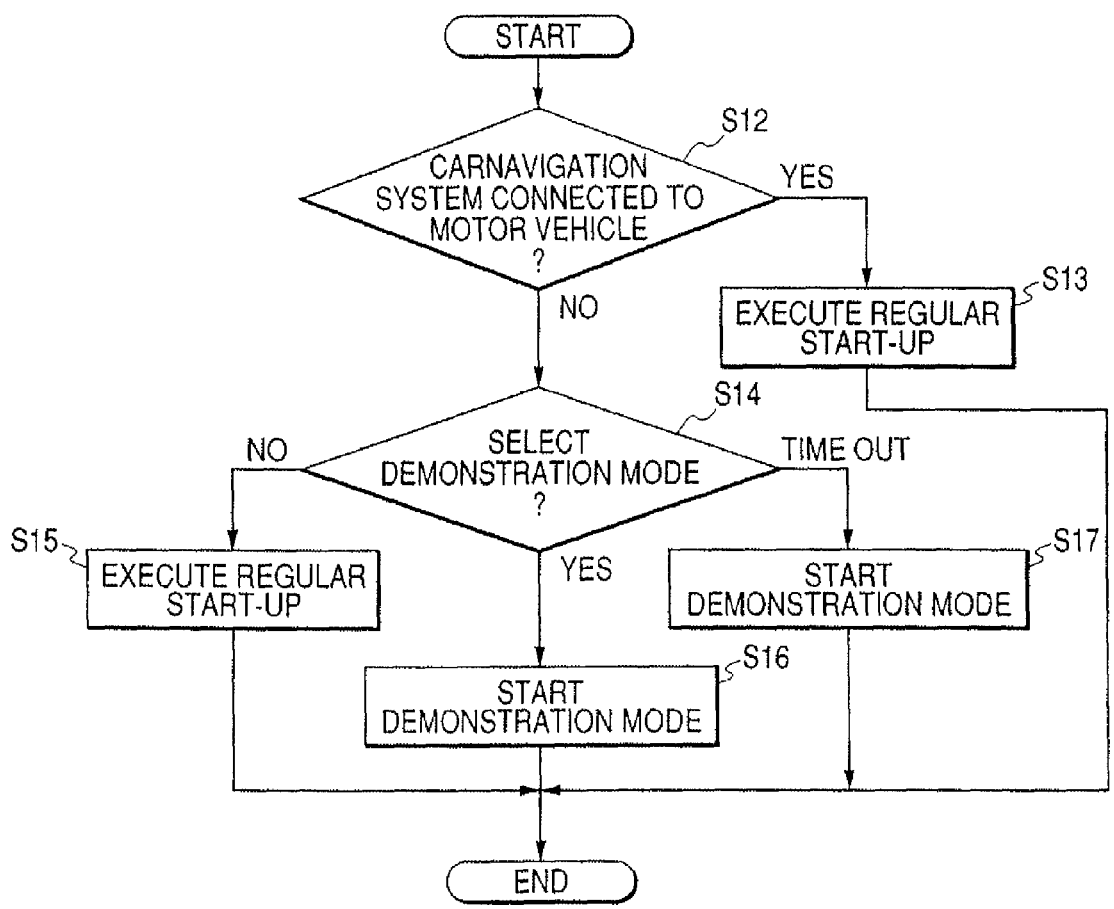
FIG. 6 is a flowchart showing the operation in the embodiment 2 of the invention.
Figure 7:
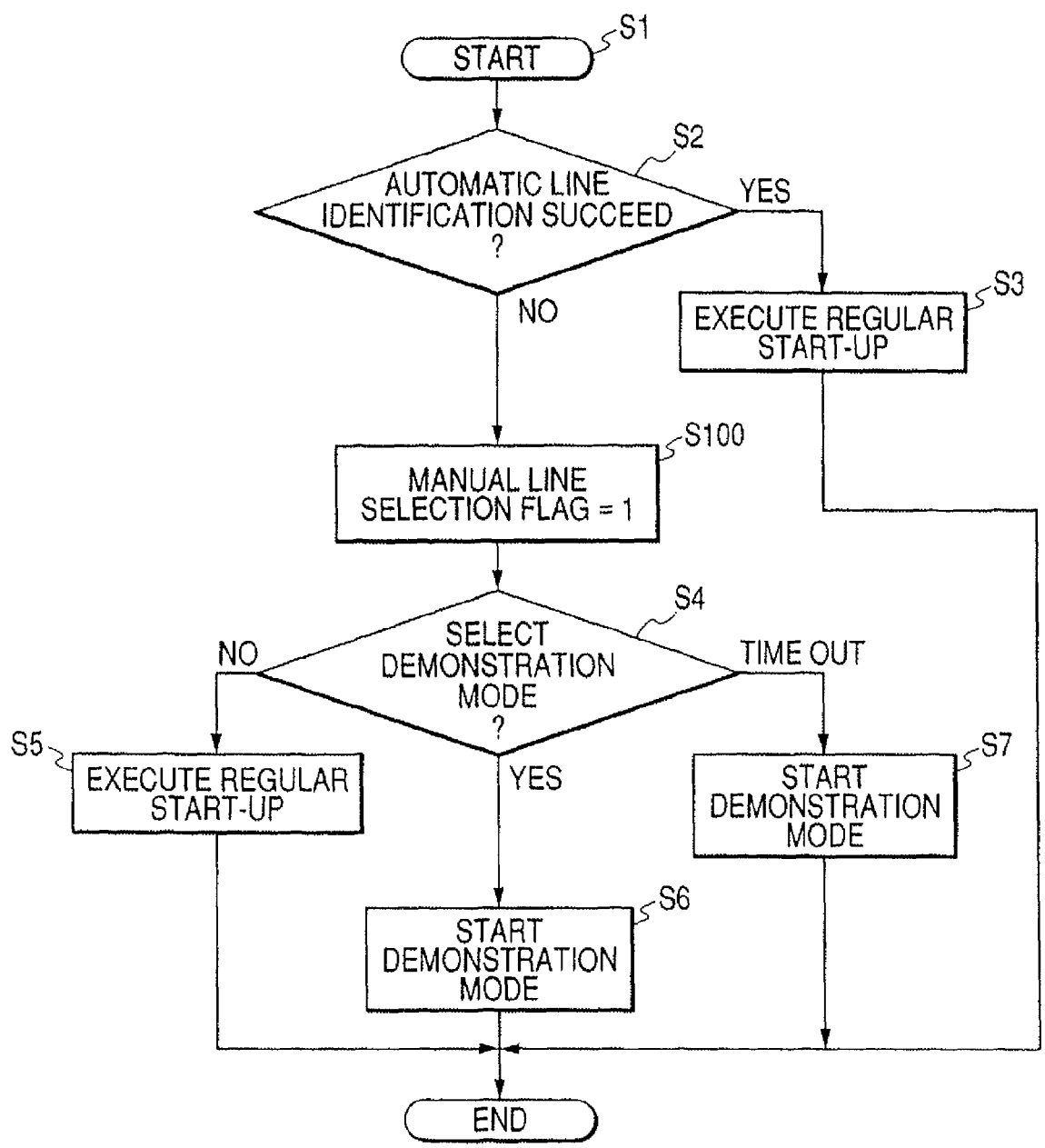
FIG. 7 is a flowchart showing the operation in the embodiment 3 of the invention.

FIG. 6 is a flowchart showing the operation in the embodiment 2 of the invention.

The embodiment 2 relates to the case where the embodiment 1 is applied to a car navigation system. Whether or not the car navigation system has been connected to a motor vehicle is discriminated in S12. If it has been connected to the motor vehicle, the regular start-up is executed in S13. If it is not connected to the motor vehicle, the display screen is shifted to a demonstration mode start-up selection display screen and the apparatus inquires of the user about whether or not the demonstration mode is started in S14.

When the user selects the not-start-up key 92, the regular start-up is executed in S15 and the processing routine is finished. When he selects the start-up key 91, the demonstration mode is started in S16 and the processing routine is finished. When the predetermined time elapses in the non-operating state, the demonstration mode is started in S17 in a manner similar to the case where the start-up key 91 has been depressed. The processing routine is finished.

Therefore, when the general user merely selects the not-start-up key 92, the demonstration mode is finished. When the salesperson in the shop of the car navigation system merely selects the start-up key 91, the demonstration mode can be started. By monitoring the non-operating state, for example, even in the case where a number of articles are exhibited in a large-scale store or the like and there is no room of setting apparatuses one by one each time the power source is turned on, the demonstration mode can be started without executing any operation and he can properly cope with such a situation.

Each of the above embodiments can be also applied to information apparatuses other than the telephone apparatus T1 and the car navigation system.

According to the foregoing embodiments, when the power source is turned on, the communicating situation is automatically identified, if the identification succeeds, the regular mode which is normally used by the user is started, and when the identification fails, the demonstration mode start-up selection display screen to select the start-up of the demonstration mode is displayed. Therefore, such a situation that the demonstration mode is started when the user turns on the power source in the state where the communication is impossible can be prevented.

According to the foregoing embodiments, the apparatus has the demonstration mode control means constructed in such a manner that when the operation to select the start-up of the demonstration mode is executed on the demonstration mode start-up selection display screen, the demonstration mode is started, and when the operation to select a mode in which the demonstration mode is not started is executed, the demonstration mode is not started and when the predetermined time elapses in the non-operating state, the demonstration mode is started. Therefore, when the user turns on the power source in the state where the communication is impossible, the user can cancel the demonstration mode by his own will. In the shop, even if the salesperson does not execute the operation to start the demonstration mode after the turn-on of the power source, the demonstration mode is automatically started. Therefore, a troublesomeness can be omitted.

According to the foregoing embodiments, since the process opposite to the process which is executed when the predetermined time elapses is shown on the initial selection display screen, for example, in the case of the apparatus which starts the demonstration mode if no operations are executed for the predetermined time, the side where the initial selection display screen is "the demonstration mode is not started" is the initial value on the demonstration mode start-up selection display screen. For the unskilled user who does not know the wording of "demonstration mode" and does not see an operation manual, when considering such a situation that he is apt to select the initial value in the unknown scene, a probability that a desired operation can be provided even for the unskilled user since the side of "the demonstration mode is not started" is the initial value is high.

(Embodiment 3)

The embodiment 3 is a modification of the embodiment 1 and is an example in which after the automatic line identification failed and the regular start-up was executed, a message for urging the user to make the manual line type setting (to execute the manual line selection) is displayed.

In the embodiment 3, the same processes as those in the embodiment 1 are designated by the same reference numerals and their description is omitted.

When the automatic line identification fails in S2, "1" is set into a manual line type setting flag (manual line selection flag) in S100.

Figure 8:
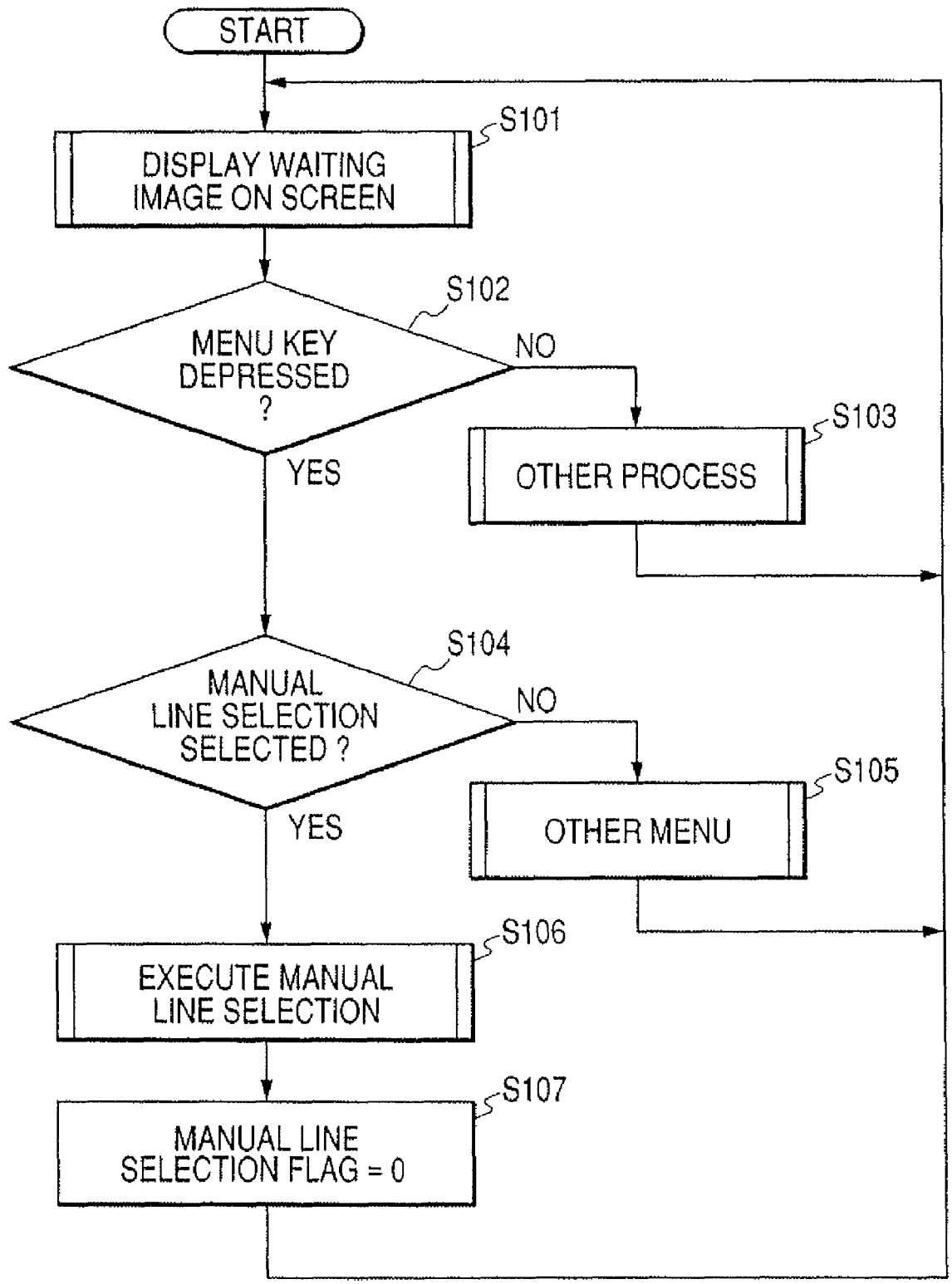
FIG. 8 is a flowchart showing the operation in the embodiment 3 of the invention.
Figure 9A:
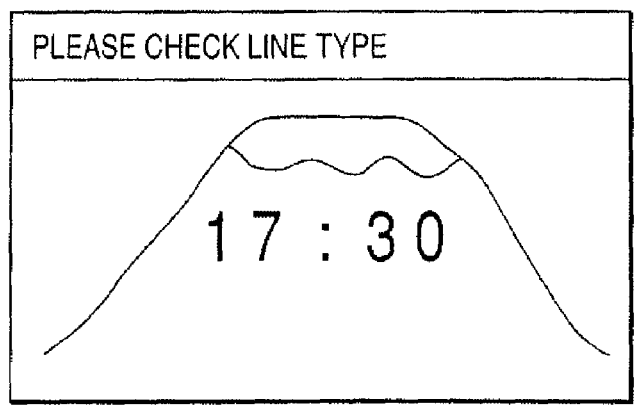
FIGS. 9A and 9B are diagrams each showing a standby display screen in the embodiment 3 of the invention.
Figure 9B:
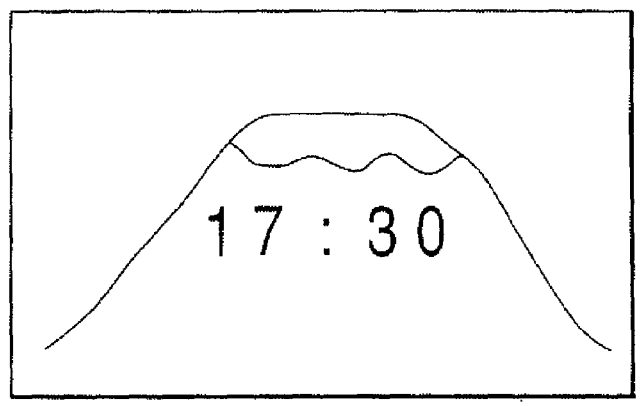

If "1" has been set in the manual line selection flag, a waiting display screen of FIG. 9A is displayed in S101 in FIG. 8. If "0" has been set in the manual line selection flag, a waiting display screen of FIG. 9B is displayed. In FIG. 9A, the message for urging the user to execute the manual line selection is displayed on the waiting display screen. In FIG. 9B, such a message is not displayed.

Figure 10:
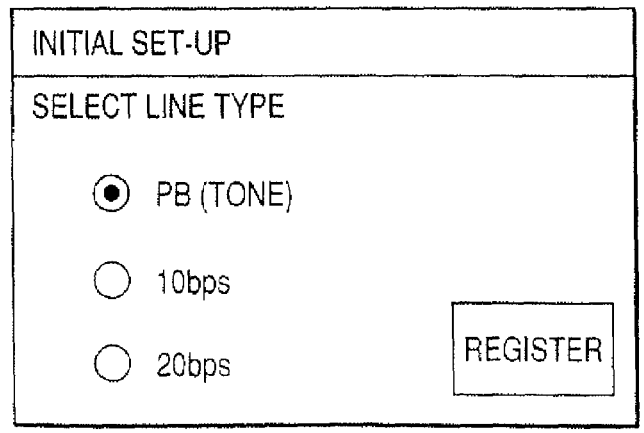
FIG. 10 is a diagram showing a line type setting display screen in the embodiment 3 of the invention.

If a menu key is depressed in S102, the processing routine advances to S104. If NO, other processes in S103 are executed. Whether or not the manual line selection has been made is discriminated in S104. If YES, S106 follows. If NO, such other menu processes are executed in S105. The manual line selection is executed in S106. In this instance, a display screen of FIG. 10 is displayed, thereby allowing the user to select the line type. If a registration button of a touch panel is depressed, the line type selected by the user is registered. After the line type was set, "0" is set into the manual line selection flag in S107.

According to the embodiment 3, even if the automatic line identification failed and the regular start-up was executed, it is possible to urge the user to make the manual line selection. Therefore, it is possible to notify the user of a countermeasure method against the case where the automatic line identification fails and the regular start-up is executed.

According to the invention, even if the user turns on the power source without setting the line after the purchase of the information apparatus and the automatic line identification fails, the mode in which the demonstration mode is not started can be selected while the selection display screen is displayed, so that the demonstration mode is not started. There is also such an effect that when the information apparatus exists in the shop, the demonstration mode can be certainly started by the minimum number of processing steps.

This application claims priority from Japanese Patent Application No. 2004-283285 filed on Sep. 29, 2004, which is hereby incorporated by reference herein.

What is claimed is:

1. An information apparatus comprising:
    an identifying unit, configured to identify an installed situation of the information apparatus;
    an executing unit, configured to execute a demonstration mode of the information apparatus; and
    a control unit, configured to cause a display device to display a selecting item for causing a user to select whether or not the demonstration mode should be started by the executing unit, in a case where the identifying unit identifies that the installed situation of the information apparatus is for starting the demonstration mode,
    and configured to control the executing unit so as to execute the demonstration mode when the user selects that the demonstration mode should be started based on the displayed selecting item.

2. An apparatus according to claim 1, wherein the identifying unit is configured to identify whether the information apparatus is connected to a telephone line.

3. An apparatus according to claim 1, wherein the identifying unit is configured to identify whether the information apparatus is connected to a motor vehicle.

4. An apparatus according to claim 1, wherein the control unit causes the executing unit to execute the demonstration mode, when the user does not select whether or not the demonstration mode should be started by the executing unit, after a predetermined time period elapses from a power source of the information apparatus being turned on.

5. An apparatus according to claim 1, wherein the control unit causes the information apparatus to perform a regular mode, in which the information apparatus is normally used by priority, when the information apparatus is operated by the user after the selecting item is displayed on the display device.

6. A controlling method of an information apparatus, comprising:
    identifying an installed situation of the information apparatus;
    displaying a selecting item for causing a user to select whether or not a demonstration mode of the information apparatus should be started, in a case where it is identified that the installed situation of the information apparatus is for starting the demonstration mode; and
    executing the demonstration mode when the user selects that the demonstration mode should be started based on the displayed selecting item.

* * * * *